United States Patent [19]

Akiba

[11] Patent Number: 5,299,377
[45] Date of Patent: Apr. 5, 1994

[54] INTER-LINE FISHING ROD
[75] Inventor: Masaru Akiba, Saitama, Japan
[73] Assignee: Daiwa Seiko, Inc., Tokyo, Japan
[21] Appl. No.: 5,410
[22] Filed: Jan. 19, 1993

Related U.S. Application Data

[63] Continuation of Ser. No. 756,281, Sep. 6, 1991, abandoned.

[30] Foreign Application Priority Data

Sep. 7, 1990 [JP] Japan .................................. 2-235689

[51] Int. Cl.⁵ ...................... A01K 87/04; A01K 87/00
[52] U.S. Cl. ......................................... 43/18.1; 43/24
[58] Field of Search ..................... 43/18.1, 24, 18.5

[56]  References Cited

U.S. PATENT DOCUMENTS

| | | | |
|---|---|---|---|
| 1,595,275 | 8/1926 | White | 43/18.1 |
| 2,282,618 | 5/1942 | Stewart | 43/18.1 |
| 2,324,429 | 7/1943 | Rondelli | 43/18.1 |
| 2,334,646 | 11/1943 | Price | 43/18.1 |
| 2,578,663 | 12/1951 | Beaupre | 43/18.1 |
| 2,776,516 | 1/1957 | Jeannette | 43/24 |
| 3,102,358 | 9/1963 | Steinle | 43/24 |
| 3,279,116 | 10/1966 | Chapman | 43/24 |
| 3,314,186 | 4/1967 | Viveiros | 43/18.1 |
| 3,727,338 | 4/1973 | Pedersen | 43/18.1 |
| 3,862,509 | 1/1975 | Petersen, Jr. | 43/18.1 |
| 4,212,126 | 7/1980 | Barnett | 43/24 |
| 5,159,776 | 11/1992 | Horton | 43/24 |

FOREIGN PATENT DOCUMENTS 31-13268  8/1956  Japan .
1018878  2/1966  United Kingdom ................ 43/18.1

Primary Examiner—Kurt C. Rowan
Attorney, Agent, or Firm—Longacre & White

[57]  ABSTRACT

An inter-line fishing rod in which a fishline is to be inserted into and passed through the inside of the rod and which includes a fishline guide sleeve fitted on the tip portion of the body o the rod, and a fishline guide ring provided on the sleeve at the front end thereof, wherein the radius of curvature of the fishline guide surface of the ring in the cross section thereof is not less than a half of the inside diameter of the tip portion. According to this arrangement, the friction resistance of the inter-line fishing rod to the movement of the fishline at the time of winding and/or unwinding thereof through the rod can be significantly reduced.

4 Claims, 1 Drawing Sheet

INTER-LINE FISHING ROD

This is a continuation of application Ser. No. 07/756,281, filed Sep. 06, 1991, which was abandoned upon the filing hereof.

BACKGROUND OF THE INVENTION

The present invention relates to an inter-line fishing rod in which a fishline is to be inserted into and passed through the inside of a fishing rod.

Such inter-line fishing rod includes a fishline guide sleeve securely fitted on the tip portion of a body of the rod and includes a fishline guide ring provided on the sleeve at the front end thereof, as disclosed in the Japan Utility Model Examined Publication No. Sho. 31-13268. However, the conventional inter-line fishing rod has a problem in that when the fishline is wound and unwound through the fishing rod, the friction resistance between the rod and the fishline is high as compared with ordinary type fishing rod. Further, the smaller the diameter of the fishing rod, the higher the friction resistance. For that reason, it has been considered that it is hard to operate the conventional inter-line fishing rod in comparison with the ordinary type fishing rod.

SUMMARY OF THE INVENTION

The present invention was made in order to solve the problem mentioned above.

Accordingly, it is an object of the invention to provide an inter-line fishing rod in which friction resistance between the fishline and the rod is significantly reduced to make it easier to wind and unwind the fishline through the rod.

The inter-line fishing rod comprises a hollow cylindrical body, a fishline guide sleeve fitted on the tip portion of the body; and a fishline guide ring provided on the sleeve at the front end thereof and formed with a fishline guide surface contacting the fishline, wherein the radius of curvature of the fishline guide surface in the cross section thereof is not less than a half of the inside diameter of the tip portion.

According to the present invention, the friction resistance between the fishline and the fishline guide sleeve provided on the tip portion of the body of the rod is reduced as much as possible, to make it easier to wind and unwind the fishline through the rod.

DETAILED DESCRIPTION OF THE INVENTION

Figure 1:
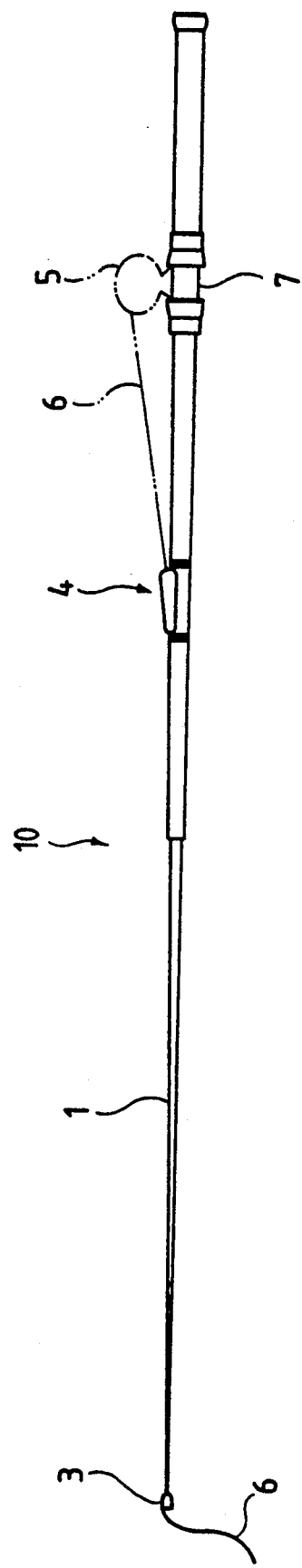
FIG. 1 is a plane view showing an inter-line fishing rod according to an embodiment of the present invention.

The present inventor conducted various experiments on how the friction resistance of each of inter-line fishing rods to the movement of a fishline at the time of winding or/and unwinding thereof through the rod is reduced. As a result, it has turned out that as for each of the fishing rods having conventional fishline guide rings, the fishline guide ring is formed with a fishline guide surface extending outwardly and being circular in cross section, but the radius of curvature of the fishline guide surface of the ring in the cross section thereof is not more than one-fifth of the inside diameter of the tip portion of the body of the rod. It has also turned out that the friction resistance of a fishing rod to the movement of a fishline at the time of winding or/and unwinding thereof through the rod can be much reduced if the radius of curvature of the fishline guide surface of the fishline guide ring of the rod in the cross section of the ring is made not less than a half of the inside diameter of the tip portion of the body of the rod. The present invention was thus achieved.

The table below shows the friction resistance of each of fishing rods to the movement of a fishline. One of the fishing rods is an example of the present invention, while the others of them are conventional ones 1 and 2. In the table, the friction resistance is expressed in terms of tension of the fishline. Each of the fishline guide rings of the fishing rods is circular in cross section. It is understood from the table that the friction resistance of the fishing rod according to the present invention is lower by as much as 20% than that of each of the conventional fishing rods 1 and 2.

|  | Fishing rod according to present invention | Conventional fishing rod 1 | Conventional fishing rod 2 |
| --- | --- | --- | --- |
| Inside diameter (mm) of tip portion of fishing rod body | 1.5 | 1.5 | 1.5 |
| Inside diameter (mm) of fishing quide ring on fishline quide sleeve | 1.5 | 1.5 | 1.5 |
| Length (mm) from front end of tip portion of fishing rod body to that of fishline quide ring | 5.0 | 5.0 | 5.0 |
| Radius (mm) of curvature of fishline guide surface of fishline quide ring in cross section thereof | 1.0 | 0.25 | 0.3 |
| Tension (g) of fishline | 260 | 340 | 330 |

(Note)
1. The length of the body of the rod is 1 m.
2. The rod is horizontally supported.
3. The resistance is measured in terms of the tension of the fishline as a weight weighing 190 g and hanging from the front end of the fishline is pulled up with it.

Although the table shows the difference between the friction resistances in comparison with that between the radii of curvature of the fishline guide surfaces of the fishline guide rings of the fishing rods, the friction resistance at the time of unwinding of the fishline can be reduced further by increasing the inside diameter of the ring and the length from the front end of the tip portion of the body of the rod to that of the ring. For that reason, it is preferable for the reduction in the friction resistance that when the inside diameter of the tip portion of the body of the fishing rod is about 1.5 mm, the inside diameter of the fishline guide ring is set at about two times of that of the tip portion of the rod body and the length from the front end of the portion to that of the ring is set at about seven times of the inside diameter of the portion, for example. Besides, the cross section of the entire fishline guide ring does not need to be circular for the reduction in the friction resistance. What is necessary for the reduction in the friction resistance is that the fishing guide surface contacting the fishline is formed such that the radius of curvature of the fishline guide surface of the ring in the cross section is not less than a half of the inside diameter of the tip portion of the body of the rod. Thus, according to the present invention, the radius of curvature of the fishline guide surface of the ring in the cross section is set to be not less than a half of the inside diameter of the tip portion of the body of the fishing rod. As a result, the fishline can be smoothly and easily wound and unwound through the fishing rod, the fishline guide sleeve and the fishline guide ring. Further, it is preferable for the reduction in the friction resistance at the time of unwinding of the fishline that the fishline guide sleeve attached to the fishing rod and formed with the fishline guide ring is shaped as a funnel such that the inner diameter of the fishline guide sleeve is gradually increased from the tip portion of the rod body to the front end of the ring so that the inner surface of the fishline guide sleeve, in cross sectional view, is positioned outside of an imaginary straight line which connects the inner surface of the fishline guide ring and the inner surface of the tip portion of the reel body. Because of such configuration of the fishline guide sleeve, the fishline is largely prevented from contacting the inner surface of the fishline guide sleeve, especially at the time of unwinding the fishline, so that the friction resistance can be reduced further.

Figure 2:
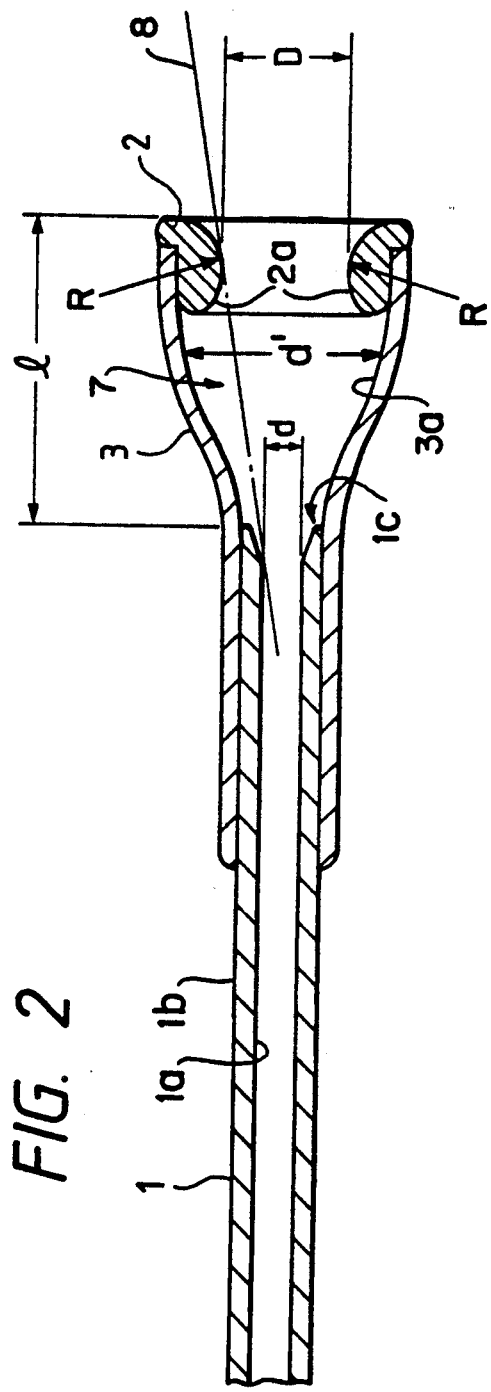
FIG. 2 is a longitudinally sectional view showing a major part of the inter-line fishing rod shown in FIG. 1.

FIG. 1 shows an inter-line fishing rod according to an embodiment of the present invention. FIG. 2 is a longitudinally sectional view of a major part of the fishing rod shown in FIG. 1.

The fishing rod 10 comprises a reel seat onto which a fishing reel 5 winding a fishline 6 is to be mounted, and a fishline guide 4 through which the fishline 6 is inserted into the interior of the fishing rod.

The fishing rod further comprises a fishline guide sleeve 3 shaped as a funnel having an interior surface 3a securely fitted on an external cylindrical surface 1b of the tip portion 1 of the body of the rod, and a fishline guide ring 2 attached to the interior surface 3a of the sleeve at the front end thereof, as shown in the drawing. The cross section of the fishline guide ring 2, which extends perpendicularly to the circumferential direction of the ring, is shaped as a comma so that the radius R of curvature of the fishline guide surface 2a of the ring in the cross section is not less than a half of the inside diameter d of the tip portion 1 of the body of the fishing rod. The ring 2 is made of a ceramic, a metal or a composite material, which is wearproof and slippery enough. The surface of the ring 2 may be hardened by processing. The sleeve 3 is made of a fiber-reinforced synthetic resin, a ceramic or the like.

An annular space 7 is provided to accommodate meandering of the fishing line 6 through the fishline guide sleeve 3. The annular space 7 is radially bounded between an imaginary line 8 extending from an internal cylindrical surface 1a of the tip portion 1 to the fishline guide surface 2l, and the interior surface 3a of the fishline guide sleeve 3a. The annular space 7 is longitudinally bounded between a terminus 1c of the tip portion 1, and the fishline guide ring 2.

An actual example of the embodiment is described from now on. the inside diameter d of the tip portion 1 of the body of the fishing rod, the inside diameter D of the fishline guide ring 2, the length l from the front end of the tip portion of the rod body to that of the ring, and the radius R of curvature of the fishline guide surface 2a of the ring in the cross section thereof were set at 1.5 mm, 3.2 mm, 10.0 mm and 1.0 mm, respectively. As a result, the friction resistance of the fishing rod to the movement of the fishline was much reduced at the time of winding of the fishline, and also reduced at the time of unwinding thereof.

The present invention is not confined to the embodiment described above, but may be embodied or practiced in other various ways without departing from the spirit or essential character of the invention.

What is claimed is:

1. An inter-line fishing rod in which a fishline is to be inserted into and passed through the inside of the rod, comprising:

a hollow cylindrical body having an internal cylindrical surface and an external cylindrical surface radially spaced therefrom;

a fishline guide sleeve having an interior surface engaged with said external cylindrical surface, wherein said fishline guide sleeve is shaped as a funnel such that the interior surface diameter of the fishline guide sleeve gradually increases from a terminus of the hollow body; and a fishline guide ring engaged with said interior surface and formed with a fishline guide surface adapted to contact the fishline, said fishline guide surface is located radially inside said interior surface and has an axial cross section with a radius of curvature not less than one half of the diameter of said internal cylindrical surface, and the interior surface of the fishline guide sleeve is positioned radially outside an imaginary straight line which connects said fishline guide surface of said fishline guide ring and said internal cylindrical surface of said body, wherein an annular space is defined which is radially bounded by said imaginary line and said interior surface as well as longitudinally bounded by said terminus of said hollow body and said fishline guide ring.

2. The inter-line fishing rod according to claim 1, wherein the inside diameter of said fishline guide surface is at least two times that of the internal cylindrical surface of said hollow body at the terminus.

3. The inter-line fishing rod according to claim 1, wherein the length from the terminus of said hollow body to that of said fishline guide ring is at least seven times the diameter of the internal cylindrical surface of said hollow body at the terminus.

4. The interline fishing rod according to claim 1, wherein the diameter d of the internal cylindrical surface of said hollow body at the terminus, the inside diameter D of said fishline guide surface, the length $\gamma$ from the terminus of said hollow body to that of said fishline guide ring, and the radius R of the curvature of said fishline guide surface viewed in the axial cross section thereof are 1.5 mm, 3.2 mm, 10.0 mm, and 1.0 mm, respectively.

* * * * *